US008056063B2

(12) United States Patent  (10) Patent No.: US 8,056,063 B2
Quan, Jr. et al.  (45) Date of Patent: Nov. 8, 2011

(54) METHOD AND APPARATUS MINIMIZING CODE DUPLICATION IN A STATICALLY TYPEABLE LANGUAGE PROGRAM

(75) Inventors: Dennis A. Quan, Jr., Quincy, MA (US); Eric David Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1493 days.

(21) Appl. No.: 11/500,584

(22) Filed: Aug. 7, 2006

(65) Prior Publication Data

US 2008/0127140 A1    May 29, 2008

(51) Int. Cl.
*G06F 9/45* (2006.01)
(52) U.S. Cl. ........................................................ 717/145
(58) Field of Classification Search ................... 717/145
See application file for complete search history.

(56) References Cited

U.S. PATENT DOCUMENTS

| 6,757,678 | B2* | 6/2004 | Myllymaki | 1/1 |
| 6,848,078 | B1* | 1/2005 | Birsan et al. | 715/206 |
| 6,889,297 | B2* | 5/2005 | Krapp et al. | 711/159 |
| 7,085,779 | B2* | 8/2006 | Holtz et al. | 1/1 |
| 7,117,216 | B2* | 10/2006 | Chakraborty et al. | 1/1 |
| 7,620,632 | B2* | 11/2009 | Andrews | 1/1 |
| 2002/0169934 | A1* | 11/2002 | Krapp et al. | 711/159 |
| 2002/0188613 | A1* | 12/2002 | Chakraborty et al. | 707/100 |
| 2003/0195890 | A1* | 10/2003 | Oommen | 707/100 |
| 2008/0059115 | A1* | 3/2008 | Wilkinson | 702/179 |

* cited by examiner

*Primary Examiner* — John Chavis
(74) *Attorney, Agent, or Firm* — Chapin IP Law, LLC; Barry W. Chapin, Esq.

(57) ABSTRACT

A method, apparatus and computer program product for minimizing code duplication in a statically typeable language program is presented. A plurality of trees of functional instructions for a program are received, each of the plurality of trees including at least one functional node. The plurality of trees of functional instructions for a program are compared and similar trees of functional instructions are merged to eliminate similar function nodes. A combined module is produced from results of the merging, the combined module having code duplication removed therefrom.

24 Claims, 2 Drawing Sheets

METHOD AND APPARATUS MINIMIZING CODE DUPLICATION IN A STATICALLY TYPEABLE LANGUAGE PROGRAM

BACKGROUND

XSL Transformations (XSLT) is a standard way to describe how to transform (change) the structure of an XML (Extensible Markup Language) document into an XML document with a different structure. XSLT is part of the XSL specification, comprising the general XSLT programming language and the XSL-FO document formatting vocabulary). XSLT is used to describe how to transform the source tree or data structure of an XML document into the result tree for a new XML document, which can be completely different in structure. The coding for the XSLT is also referred to as a style sheet.

Dynamically typed languages such as XSLT and XQuery sometimes support constructs for separating code into reusable libraries. Typically, however, the dynamic type system imposes context sensitivity on the linking of such reusable modules. Several products and projects exist to detect source code similarities in large codebases. (see for example http://www.redhillconsulting.com.au/products/simian/) These tools however, are designed only as an aid to developers to flag sections of code that may be eligible for reuse. This obviously does nothing to improve runtime memory costs without human intervention, and further, does not solve the problem of context-sensitive importing of code modules in dynamically statically typeable languages.

In the area of Internationalization, most prior work has gone into tooling and library support for manual modularization. This can require careful planning, and human intervention to achieve. Furthermore, as mentioned above, in the presence of context-sensitive inclusions, source-code modularity may not translate to runtime modularity. Our invention is differentiated by focusing on the automatic determination of runtime modularity, regardless of the actual source code modularity.

SUMMARY

Conventional mechanisms such as those explained above suffer from a variety of deficiencies. One such deficiency is that when compilation is used to improve runtime performance, each of these context-sensitive inclusions will result in a context-specialized copy of the included code. This means that while the original code artifacts may be reused, the resulting compiled forms contain many copies of the same code with minor differences. Furthermore, where the linking mechanisms the language are insufficient, unsuitable for a given development environment, or even simply unused in the interest of expediency, or case-specific, it is common to find code which is shared in its origin, but duplicated in the actual artifacts. In either case, the result of a normal compilation process will be the same: large sections of similar code, compiled into distinct executable artifacts, resulting in heavy use of memory at runtime.

A common example domain where this problem is especially acute is in internationalization, where a family of small libraries containing internationalized message strings are each compiled together with a larger library, resulting in massive duplication.

Embodiments of the invention significantly overcome such deficiencies and provide mechanisms and techniques that compile the independent source artifacts into an intermediate form, with all inclusions fully expanded, and then to actively recombine duplicated code using a diff-like process to analyze the similarities between the several compiled versions. This effectively combines the independent, compiled programs together, eliminating duplication, and recapturing the modularity (either explicit, or implicit) of the original sources. The result is a single module which is invoked with an integer to discriminate between the original, separate main programs.

In a particular embodiment of a method of minimizing code duplication in a program written in a statically typeable language program, the method includes receiving a plurality of trees of functional instructions for a program, each of the plurality of trees including at least one functional node. The method further includes comparing the plurality of trees of functional instructions for a program and merging the trees of functional instructions to eliminate similar function nodes. Additionally, the method includes producing a combined module from results of the merging, the combined module having code duplication removed therefrom.

Other embodiments include a computer readable medium having computer readable code thereon for minimizing code duplication in a statically typeable language program. The medium includes instructions for receiving a plurality of trees of functional instructions for a program, each of the plurality of trees including at least one functional node. The computer readable medium further includes instructions for comparing the plurality of trees of functional instructions for a program and instructions for merging the trees of functional instructions to eliminate similar function nodes. The computer readable medium further includes instructions for producing a combined module from results of the merging, the combined module having code duplication removed therefrom.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides for minimizing code duplication in a statically typeable language program as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for minimizing code duplication in a statically typeable language program as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
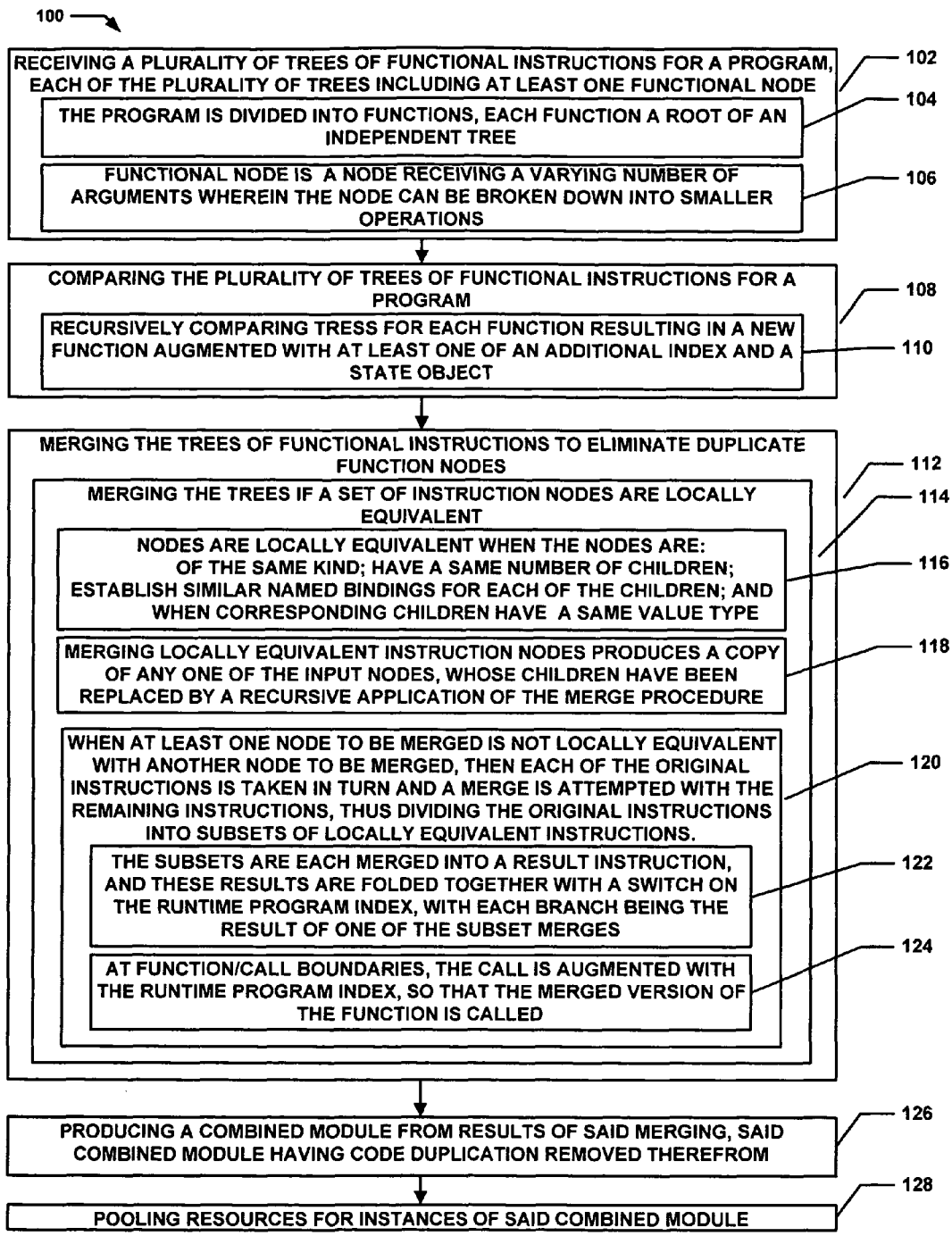
FIG. 1 depicts a flow diagram of a particular embodiment of a method for minimizing code duplication in a statically typeable language program.

The present invention compiles the independent source artifacts into an intermediate form, with all inclusions fully expanded, and then actively recombines duplicated code using a diff-like process to analyze the similarities between the several compiled versions. This effectively combines the independent, compiled programs together, eliminating duplication, and recapturing the modularity (either explicit, or implicit) of the original sources. The result is a single module which is invoked with an integer to discriminate between the original, separate main programs.

Consider a family of XSL stylesheets (or other analogous programs) that differ only by the content in specific areas of the program. A good example of this is a family of stylesheets that differ only by the localization of error messages. Such a family of stylesheets could be rewritten into a single stylesheet that, depending on an integer parameter, would switch to run in a mode that would produce output corresponding to one of the original stylesheets. This is what the compiler (referred to herein as an autofunctorizing compiler) does. The process is achieved automatically, without any user intervention to indicate the origins of the code duplication. In this way, the technique is applicable both to code compiled from explicitly modularized source artifacts, and to code that is physically duplicated (and partially modified), but may originate from a single original source.

The input to the autofunctorization process is an intermediate, compiled form where each program is represented with a tree of functional instruction nodes, where each node may be one of a variety of primitive instruction kinds, such as an arithmetic operation like add, a binding node like let, or a looping node like for-each. The program may be divided into functions, each of which is the root of an independent tree. This abstract model, which is independent of syntax, or other language details, may be used to describe any program which is defined in any language, such as Haskell, ML, XSL, etc.

The core of autofunctorization is a diff-like process where a set of trees representing individual programs (or portions thereof) are compared, and merged to eliminate duplication. The diff process is carried out for each function which appears to be similar among the original programs. A function may be deemed similar in one embodiment when parts of the names of the functions match. The instruction node trees for each function are recursively compared, and merged according to a simple set of rules. The result is a new function, which is augmented with an additional argument specifying (at runtime) the program index corresponding to the original program to be executed.

The process of merging the instruction trees depends on the properties of the nodes involved. In particular, each instruction node is of a particular kind, and may have an arbitrary number of children. Additionally, nodes may establish a number of variable bindings in each of their child instructions' contexts (for example, let is used in several functional languages to bind a single variable using one child, in the context of the other). In statically typeable languages, an instruction node will also have a value type (which may be calculated through type-analysis), which is the type of the value that the instruction will return. A set of instructions nodes can be merged if they are pairwise locally equivalent, where two instructions are locally equivalent if they are of the same kind, have the same number of children, establish identically named bindings (if any) for each of those children, and if their corresponding children have the same value type. This may be applicable when the language is statically typeable, when the program can be rewritten in a statically typed form, or translated into statically type form.

The result of merging locally equivalent instruction nodes is a copy of any one of the input nodes, whose children have been replaced by a recursive application of the merge algorithm. When one or more nodes in the set to be merged is not locally equivalent, then each of the original instructions is taken in turn and a merge is attempted with the remaining instructions, thus dividing the original instructions into (potentially singleton) subsets of locally equivalent instructions. These subsets are each merged into a result instruction, and these results are folded together with a switch on the runtime program index, with each branch being the result of one of the subset merges. This switch is the final result of the overall merge. At function/call boundaries, the call is augmented with the runtime program index, so that it will call the augmented (merged) version of the function.

The following pseudocode demonstrates the merge process:

```
Instruction merge(Node[ ] Nodes, int[ ] Numbers) {
  if (Nodes.length == 1)
    return Nodes[0];
  SwitchNode resultSwitch;
  resultSwitch.condition = PROGRAM_NUMBER;
  for (int i=0;i<Nodes.length;i++) {
    if (Nodes[i] == NULL)
      continue;
    Node[ ] Subset Nodes2;
    int[ ] Subset Numbers2;
```

```
        subsetNodes.append(Nodes[i]);
        subsetNumbers.append(Numbers[i]);
        for (int j=i+1;j<Nodes.length;j++) {
            if (Nodes[j] == NULL)
                continue;
            if (locallyEquivalent(Nodes[i] ,Nodes[j])) {
                subsetNodes.append(Nodes[j]);
                subsetNumbers.append(Numbers[j]);
                Nodes[j] = NULL;
            }
        }
        Node subsetResult = localCopy(subsetNodes[0]);
        for (int k=0;k<subsetResult.children.length;k++) {
            Node[ ] children;
            for (int j=0;j<subsetNodes.length;j++) {
                children.append(subsetNodes[j].children[k]);
            }
            subsetResult.children[k] = merge(childNodes,subsetNumbers);
        }
        resultSwitch.cases.append(subsetNumbers,subsetResult);
    }
    if (resultSwitch.cases.length == 1) {
        return resultSwitch.cases[0].handler;
    }
    return resultSwitch;
}
```

In some syntaxes, repeated use of binary operators such as addition, or string concatenation, may be abbreviated by combining the series of operands into a single, variable-argument expression. For example, in Scheme, the addition of five numbers may be expressed as (+a(+b(+c(+d e)))), or equivalently as (+a b c d e). When applying the algorithm above, the instruction node model should be considered to apply to the desugared, binary version. This way, commonalities may be found in such expressions even when their number of children differ for example, when desugared as above, the addition (+a b c d e f) may be effectively merged with the addition (+a b c d e f g), up to the point where the two trees differ. Note also that such desugarings are not unique, and that the same addition can be equivalently expressed as (+(+(+(+a b)c)d)e), an alternative which would be advantageous when attempting to merge with the addition (+q a b c d e). In general, a variety of search approaches may be tried when attempting to merge such expressions, where the most beneficial is selected.

After the whole program has been analyzed for potential overlap, typical optimizations may be performed, including dead parameter elimination, which will eliminate the use of the program index for branches of the code which are wholly invariant, and dead function elimination, which will remove the original, duplicated versions of the merged functions. The result is a combined module in which code duplication has been automatically removed. New main entry points may then be generated for each of the original programs which call into the combined module, using their specified program index.

In addition to the reduction in aggregate code size which results from the autofunctorization process, reductions in runtime memory usage are also made possible. When the various original programs have been combined into a single module, it will be possible to pool resources, such as reusable buffers, and other in-memory, runtime data, among instances of the resultant, combined program. In effect, this allows pooling of resources among all of the input programs, rather than just among instances of a single program. Referring again to the example of internationalized programs running on a same server, this allows sharing of runtime resources among all of the language-specific versions of the program, rather than just within a given language. In particular, this means that these resources may be effectively pooled and exploited even by versions of the program that are used infrequently (such as for uncommon languages). Furthermore, they may be reused evenly, even when the usage of the several versions does not occur evenly. For example, if the internationalized versions of the programs are used to serve customers in disparate geographies, then one may expect that the peak usage for those geographies (and thus for their specific, local version) will vary according to the timezone of the geography in question. By pooling the runtime resources among the several versions, the rotation of these peaks among the several versions of the program will not perturb resource usage.

Runtime resource sharing is supported through a program pool, which will return program instances pre-initialized with the state to execute a given original program. The state is managed automatically at runtime, through an interface contract in which a given program facade (that is, the generated version-specific entry-point, which calls into the combined module with the correct program index) can be queried for what its regular program index is, what the "master" facade is, and can also be reinitialized to behave like any of the other facades by resetting its program index. At runtime facades are grouped within the program pool according to their master facade (as obtained from the interface contract), such that only the programs that were compiled together are in a specific group. In addition, a table is maintained, mapping facade names to program indices. This table is populated by querying the interface contract for the regular program index, as the facade code is loaded. When a particular facade is requested from the pool, the appropriate facade group is found, and a live instance fetched from the relevant pool. The instance is then initialized with the requested facade's program index, and returned to the caller for use as the requested facade. When no live program instance is available in the pool, a new one is created. When the instances are returned to the pool, they are re-entered in the group according to their master facade, to await further requests on any of the facades in the group.

A flow chart of the presently disclosed method is depicted in FIGS. 1A and 1B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 1, a method 100 of minimizing code duplication in a statically typeable language program is shown. The method 100 begins with processing block 102 which recites receiving a plurality of trees of functional instructions for a program, each of the plurality of trees including at least one functional node. As recited in processing block 104 the program is divided into functions, each function a root of an independent tree. As further recited in processing block 106, the functional node is a node receiving a varying number of arguments wherein the node can be broken down into smaller operations.

Processing continues with processing block 108 which discloses comparing the plurality of trees of functional instructions for a program. This may further involve, as shown in processing block 110, recursively comparing trees for each function resulting in a new function augmented with at least one of an additional index and a state object.

Processing block 112 states merging the trees of functional instructions to eliminate similar function nodes. Processing block 114 recites merging the trees if a set of instruction nodes are locally equivalent. Processing block 116 discloses wherein nodes are locally equivalent when the nodes are of the same kind; have a same number of children; establish similar named bindings for each of the children; and when corresponding children have a same value type. Processing block 118 states merging locally equivalent instruction nodes produces a copy of any one of the input nodes, whose children have been replaced by a recursive application of the merge procedure.

Processing block 120 discloses when at least one node to be merged is not locally equivalent with another node to be merged, then each of the original instructions is taken in turn and a merge is attempted with the remaining instructions, thus dividing the original instructions into subsets of locally equivalent instructions. This may further include, as recited in processing block 122, the subsets are each merged into a result instruction, and these results are folded together with a switch on the runtime program index, with each branch being the result of one of the subset merges. As recited in processing block 124 at function/call boundaries, the call is augmented with the runtime program index, so that the merged version of the function is called.

Processing block 126 recites producing a combined module from results of the merging, the combined module having code duplication removed therefrom. Processing block 128 discloses comprising pooling resources for instances of said combined module.

Figure 2:
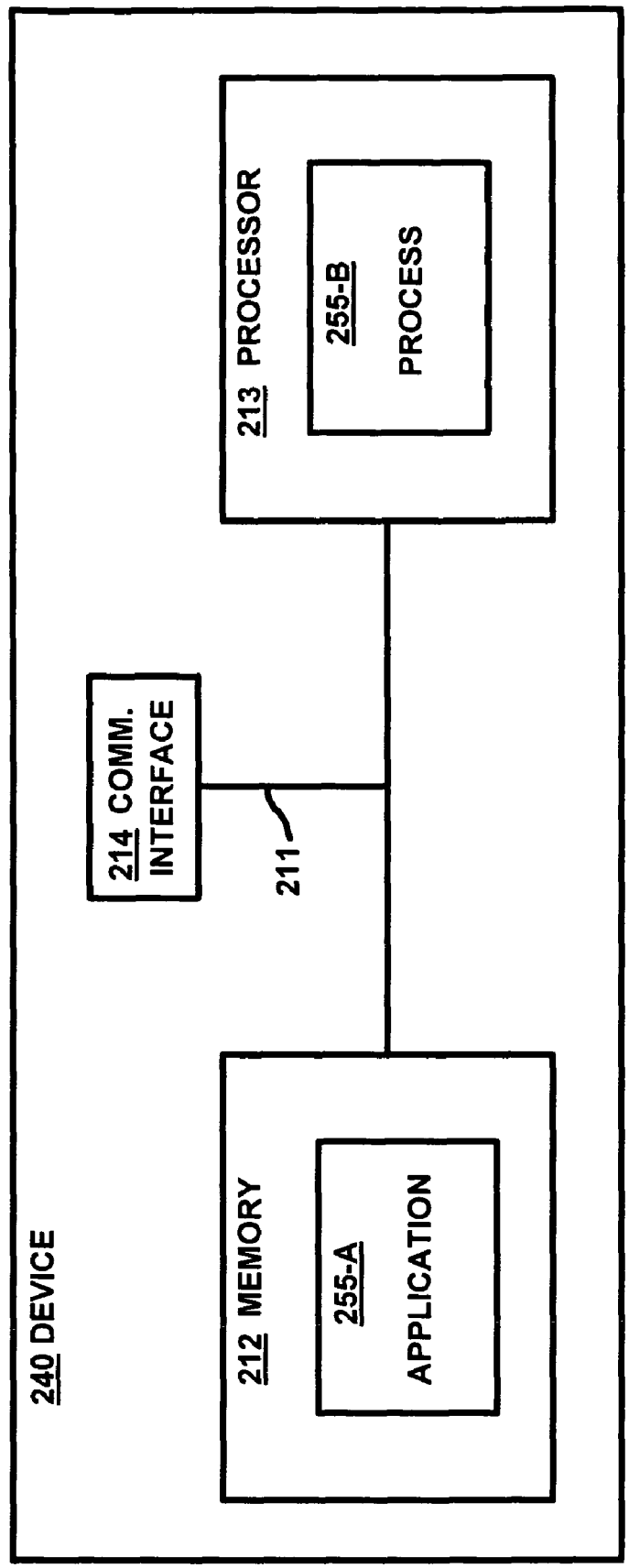
FIG. 2 illustrates an example computer system architecture for a computer system that minimizes code duplication in a statically typeable language program in accordance with embodiments of the invention.

FIG. 2 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the agent application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A computer implemented method of minimizing code duplication in a statically typed language program comprising:
   receiving a plurality of trees of functional instructions for a program, each of said plurality of trees including at least one functional node;
   comparing said plurality of trees of functional instructions for a program;
   merging said trees of functional instructions to eliminate similar function nodes if a set of instruction nodes are locally equivalent;
   dividing the instructions into subsets of locally equivalent instructions;
   merging subsets of locally equivalent instructions into a result instruction;
   folding the result instruction together with a switch on a runtime program index, with a merged tree branch being the result of one of the subset merges; and
   producing a combined module from results of said merging, said combined module having code duplication removed therefrom.

2. The method of claim 1 wherein said program is divided into functions, each function a root of an independent tree.

3. The method of claim 1 wherein functional node is a node receiving a varying number of arguments wherein the node can be broken down into smaller operations.

4. The method of claim 1 wherein said comparing said plurality of trees of functional instructions for a program comprises recursively comparing trees for each function resulting in a new function augmented with one of an additional index and a state object where applicable.

5. The method of claim 1 wherein said merging said trees of functional instructions to eliminate similar function nodes comprises merging said trees if a set of instruction nodes are locally equivalent.

6. The method of claim 5 wherein nodes are locally equivalent when said nodes:
- are of a similar kind;
- have a similar number of children;
- establish similar named bindings for each of said children; and
- when corresponding children have a similar value type.

7. The method of claim 5 wherein said merging locally equivalent instruction nodes produces a copy of any one of the input nodes, whose children have been replaced by a recursive application of the merge procedure.

8. The method of claim 5 wherein when at least one node to be merged is not locally equivalent with another node to be merged, then each of the original instructions is taken in turn and a merge is attempted with the remaining instructions, thus dividing the original instructions into subsets of locally equivalent instructions.

9. The method of claim 8 wherein said subsets are each merged into a result instruction, and these results are folded together with a switch on a runtime program index, with each branch being the result of one of the subset merges.

10. The method of claim 9 wherein at function/call boundaries, the call is augmented with the runtime program index, so that the merged version of the function is called.

11. The method of claim 1 further comprising pooling resources for instances of said combined module.

12. The computer implemented method of method of claim 1 further comprising
- invoking the combined module with the runtime program index to discriminate between original, separate main programs.

13. The computer implemented method of claim 12 further comprising providing internationalization.

14. A computer readable storage medium having computer readable code thereon for minimizing code duplication in a statically typed language program, the medium comprising:
- instructions for receiving a plurality of trees of functional instructions for a program, each of said plurality of trees including at least one functional node;
- instructions for comparing said plurality of trees of functional instructions for a program;
- instructions for merging said trees of functional instructions to eliminate similar function nodes if a set of instruction nodes are locally equivalent;
- instructions for dividing the instructions into subsets of locally equivalent instructions;
- instructions for merging subsets of locally equivalent instructions into a result instruction;
- instructions for folding the result instruction together with a switch on a runtime program index, with a merged tree branch being the result of one of the subset merges; and
- instructions for producing a combined module from results of said merging, said combined module having code duplication removed therefrom.

15. The computer readable storage medium of claim 14 further comprising instructions for dividing said program into functions, each function a root of an independent tree.

16. The computer readable storage medium of claim 14 further comprising instructions wherein said functional node comprises a node receiving a varying number of arguments wherein the node can be broken down into smaller operations.

17. The computer readable storage medium of claim 14 wherein said instructions for comparing said plurality of trees of functional instructions for a program comprises instructions for recursively comparing trees for each function resulting in a new function augmented with at least one of an additional index and a state object where applicable.

18. The computer readable storage medium of claim 14 wherein said instructions for merging said trees of functional instructions to eliminate similar function nodes comprises instructions for merging said tress if a set of instruction nodes are locally equivalent.

19. The computer readable storage medium of claim 18 further comprising instructions for determining nodes are locally equivalent when said nodes are:
- of the similar kind;
- have a similar number of children;
- establish similar named bindings for each of said children; and when corresponding children have a similar value type.

20. The computer readable storage medium of claim 18 wherein said instructions for merging locally equivalent instruction nodes produces a copy of any one of the input nodes, whose children have been replaced by a recursive application of the merge procedure.

21. The computer readable storage medium of claim 18 further comprising instructions for when at least one node to be merged is not locally equivalent with another node to be merged, then each of the original instructions is taken in turn and a merge is attempted with the remaining instructions, thus dividing the original instructions into subsets of locally equivalent instructions.

22. The computer readable storage medium of claim 21 further comprising instructions wherein said subsets are each merged into a result instruction, and these results are folded together with a switch on a runtime program index, with each branch being the result of one of the subset merges.

23. The computer readable storage medium of claim 22 further comprising instructions wherein at function/call boundaries, the call is augmented with the runtime program index, so that the merged version of the function is called.

24. The computer readable storage medium of claim 14 further comprising instructions for pooling resources for instances of said combined module.

* * * * *